United States Patent
Hong (10) Patent No.: US 12,160,928 B2
(45) Date of Patent: Dec. 3, 2024

(54) METHOD AND DEVICE FOR DETERMINING SUPPORT INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 410 days.

(21) Appl. No.: 17/640,275

(22) PCT Filed: Sep. 5, 2019

(86) PCT No.: PCT/CN2019/104571
§ 371 (c)(1),
(2) Date: Mar. 3, 2022

(87) PCT Pub. No.: WO2021/042333
PCT Pub. Date: Mar. 11, 2021

(65) Prior Publication Data
US 2022/0322071 A1    Oct. 6, 2022

(51) Int. Cl.
*H04W 8/20* (2009.01)
*H04W 48/08* (2009.01)
*H04W 48/16* (2009.01)
*H04W 76/15* (2018.01)

(52) U.S. Cl.
CPC ........... *H04W 8/205* (2013.01); *H04W 48/08* (2013.01); *H04W 48/16* (2013.01); *H04W 76/15* (2018.02)

(58) Field of Classification Search
CPC ..... H04W 8/205; H04W 48/08; H04W 48/16; H04W 76/15; H04W 48/18; H04W 88/06; H04W 8/183; H04W 76/10
See application file for complete search history.

(56) References Cited

U.S. PATENT DOCUMENTS

| | | | |
|---|---|---|---|
| 9,474,105 B2 | 10/2016 | Awoniyi-Oteri et al. | |
| 11,172,406 B2* | 11/2021 | Hampali | H04L 47/2491 |
| 2016/0219648 A1* | 7/2016 | Awoniyi-Oteri | H04W 8/24 |
| 2018/0359688 A1* | 12/2018 | An | H04W 48/12 |
| 2019/0253962 A1* | 8/2019 | Kiessling | H04W 48/18 |
| 2019/0261159 A1* | 8/2019 | Wang | H04W 76/18 |
| 2019/0357131 A1* | 11/2019 | Sivavakeesar | H04W 76/15 |
| 2021/0282103 A1* | 9/2021 | Zhu | H04W 76/15 |
| 2022/0166849 A1* | 5/2022 | Sun | H04W 52/0212 |

OTHER PUBLICATIONS

Indian Patent Application 202247020270, Office Action dated Aug. 4, 2022, 6 pages.

* cited by examiner

Primary Examiner — Angelica Perez
(74) Attorney, Agent, or Firm — Cozen O'Connor (57) ABSTRACT

A method for determining support information includes: transmitting, by a first SIM in the multiple SIMS, information on n first network slices supported by the first SIM to a network-side device, during a process of establishing a connection by the first SIM with the network-side device, n≥1; receiving, by the first SIM, first support information of the network-side device for the n first network slices, from the network-side device; and transmitting, by the first SIM, the first support information to a second SIM in the multiple SIMs.

12 Claims, 9 Drawing Sheets transmitting, by a first SIM in the multiple SIMs, information on n first network slices supported by the first SIM to a network-side device, during a process of establishing a connection by the first SIM with the network-side device, n≥ 1 — S1 receiving, by the first SIM, first support information of the network-side device for the n first network slices, from the network-side device — S2 transmitting, by the first SIM, the first support information to a second SIM in the multiple SIMs — S3

METHOD AND DEVICE FOR DETERMINING SUPPORT INFORMATION

CROSS-REFERENCE TO RELATED APPLICATION

This application is a national phase of International Application No. PCT/CN2019/104571, filed on Sep. 5, 2019, the entire content of which is incorporated herein by reference.

TECHNICAL FIELD

The disclosure relates to the field of communication technologies, and more particularly, to a method for determining support information, and an electronic device and a computer-readable storage medium.

BACKGROUND

In the related art, multiple subscriber identification modules (SIMS) may be set in a multi-SIM terminal. The network may treat different SIMS as different terminals. Different SIMS may separately establish a connection with a network-side device.

Network resources of the fifth-generation mobile communication technology (5G) may be divided into multiple network slices. Network slices supported by different SIMS may be different. Support conditions for network slices in the network-side device may also be different. To make the network-side device determine a network slice supported by a SIM, in the related art, the SIM may transmit information on the network slice supported by the SIM to the network-side device during a process of establishing the connection by the SIM with the network-side device.

SUMMARY

According to a first aspect of embodiments of the disclosure, a method for determining support information is provided. The method is applicable to a terminal. The terminal is provided with multiple SIMS. The method includes the following.

Transmitting, by a first SIM in the multiple SIMS, information on n first network slices supported by the first SIM to a network-side device, during a process of establishing a connection by the first SIM with the network-side device, $n \geq 1$.

Receiving, by the first SIM, first support information of the network-side device for the n first network slices, from the network-side device.

Transmitting, by the first SIM, the first support information to a second SIM in the multiple SIMs.

According to a second aspect of embodiments of the disclosure, an electronic device is provided.

The electronic device includes a processor.

The electronic device further includes a memory for storing instructions executable by the processor.

The processor is configured to perform the method for determining support information described in any of the foregoing embodiments.

According to a third aspect of embodiments of the disclosure, a non-transitory computer-readable storage medium is provided. The computer-readable storage medium has stored therein instructions that, when executed by a processor, the method for determining support information described in any of the foregoing embodiments is performed.

BRIEF DESCRIPTION OF THE DRAWINGS

To more clearly describe technical solutions in embodiments of the disclosure, it will briefly introduce the drawings needed in the description. The drawings in the following description are only some embodiments of the disclosure. For those of ordinary skill in the art, without creative labor, other drawings may be obtained based on these drawings.

DETAILED DESCRIPTION

The technical solutions in embodiments of the disclosure will be clearly and completely described below in conjunction with the drawings in embodiments of the disclosure. Embodiments described herein are only a part of embodiments of the disclosure, rather than all the embodiments. Based on embodiments in the disclosure, all other embodiments obtained by those of ordinary skill in the art without creative work shall fall within the protection scope of the disclosure.

In the related art, a SIM may transmit information on a network slice supported by the SIM to the network-side device during a process of establishing a connection by the SIM with the network-side device. The network-side device may, based on whether it supports the network slice supported by the SIM, transmit feedback information to the SIM, and also decide whether to allow the terminal to connect to the network-side device.

However, different SIMS do not interact with each other about the received feedback information of the network-side device. This may cause the following situation. For example, SIM 1 in the terminal determines that the network-side device does not support network slice A based on the feedback information of the network-side device. SIM 2 in the terminal supports network slice A and network slice B but does not know that the network-side device does not support network slice A. SIM 2 still transmits the information on network slice A supported by SIM 2 during the subsequent process of establishing the connection with the network-side device. Since the network-side device does not support network slice A, it may refuse to establish the connection with SIM 2, causing a waste of resources and signalings when SIM 2 initiates the process of establishing the connection with the network-side device. Or SIM 2 has established the connection with a base station in the network-side device, but a core network in the network-side device does not support the network slice supported by SIM 2, which may also cause adverse effects on the interaction of the SIM 2 and the core network. Compared with the case where the core network supports the network slice supported by the SIM 2, there is also a waste of resources and signalings.

Figure 1:
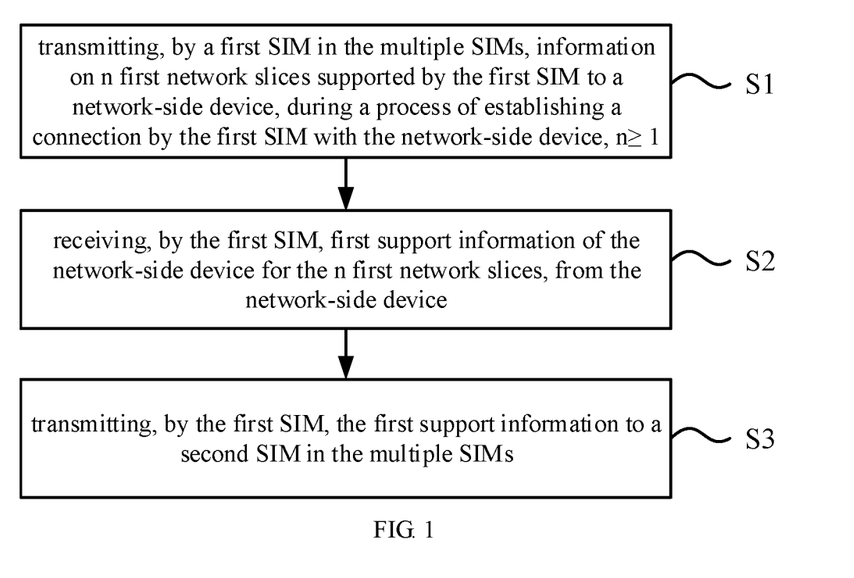
FIG. 1 is a flowchart illustrating a method for determining support information according to embodiments of the disclosure.

FIG. 1 is a flowchart illustrating a method for determining support information according to embodiments of the disclosure. The method for determining support information in embodiments may be applicable to a terminal. The terminal may include, but not limited to, an electronic device such as a mobile phone, a tablet computer and a wearable device. The terminal may be used as user equipment to communicate with the network-side device (such as a base station, a core network). For example, the terminal may communicate with the network-side device based on 5G New Radio (NR).

Multiple SIMS may be set in the terminal, for example, two SIMS may be set, or more than two SIMS may be set. There may be SIMS using different operator networks in the multiple SIMS. There may also be SIMS using the same operator network in the multiple SIMS.

As illustrated in FIG. 1, the method for determining support information may include the following.

In S1, a first SIM in the multiple SIMS transmits information on n first network slices supported by the first SIM to a network-side device (for example, a base station, a core network), during a process of establishing a connection by the first SIM with the network-side device, n≥1.

In S2, the first SIM receives first support information of the network-side device for the n first network slices, from the network-side device In S3, the first SIM transmits the first support information to a second SIM in the multiple SIMS. The first SIM and the second SIM do not refer to certain SIMS but refer to two different SIMS in the multiple SIMS.

In some embodiments, the process of establishing the connection between the first SIM and the network-side device may include a random access (either competitive random access or non-competitive random access) process. When the random access is successful, the first SIM may transmit a connection-establishment-completing message to the network-side device. The connection-establishment-completing message carries the information on the n first network slices supported by the first SIM, where n≥1, and n may be an integer greater than or equal to 1, for example, 2, 3 or the like.

It should be noted that network slices (including the n first network slices described above and m second network slices described below) described in embodiments of the disclosure are for the 5G network. The 5G network is divided into different types of virtual networks in terms of logical level. For example, it may be divided based on services in the 5G network. For example, the 5G network is suitable for enhanced mobile broadband (eMBB) service, massive machine type communication (mMTC) service and ultra-reliable and low latency communication (uRLLC) service, so that the 5G network may be divided into 3 network slices corresponding to the above 3 types of services. The SIM supports the corresponding network slice based on its applicable service.

Of course, the dividing manner on the network slices is not limited to the above, and the network may also be divided according to needs to obtain network slices of different granularities, which is not limited in the disclosure.

After the first SIM transmits the information on the n first network slices supported by the first SIM to the network-side device, the network-side device may determine the first support information for the n first network slices, that is, which network slice among the n first network slices is supported and which network slice among the n first network slices is not supported. In detail, it may be determined that an access and mobility management function (AMF) network element in the core network supports which network slice in the n first network slices and does not support which network slice in the n first network slices. For the network-side device (for example, the core network), it may include one or more AMF network elements, and the support information of some or all of the AMF network elements for the n first network slices may be determined.

In the implementation, after the first SIM receives the first support information of the network-side device for the n first network slices, it may transmit the first support information to the second SIM in the multiple SIMS. The second SIM may also learn the first support information of the network-side device for the n first network slices, so that the second SIM may transmit the information on the network slice supported by the network-side device to the network-side device during the process of establishing the connection by the second SIM with the network-side device. Therefore, the second SIM and the network-side device supporting the network slice supported by the second SIM may establish the connection, avoiding a waste of resources and signalings.

For example, the first SIM supports network slice A and network slice B. During the process of establishing the connection with the network-side device, the information on network slice A and network slice B supported by the first SIM is transmitted to the network-side device. The network-side device supports network slice A, but does not support network slice B. The first support information may be fed back to the first SIM, which indicate the first SIM that the network-side device supports network slice A but does not support network slice B.

The first SIM may transmit the first support information to the second SIM, so that the second SIM learns that the network-side device supports network slice A and does not support network slice B. When the second SIM supports network slice A and network slice C, the second SIM may transmit the information on network slice A supported by the second SIM to the network-side device during the process of establishing the connection with the network-side device, instead of transmitting the information on network slice C supported by the second SIM. Since the network-side device also supports network slice A, it may establish the connection with the second SIM, so that the network-side device connected to the second SIM and the second SIM may support the same network slice, ensuring that the second SIM communicating with the network-side device has good effects, and reducing the waste of signalings and resources.

Figure 2:
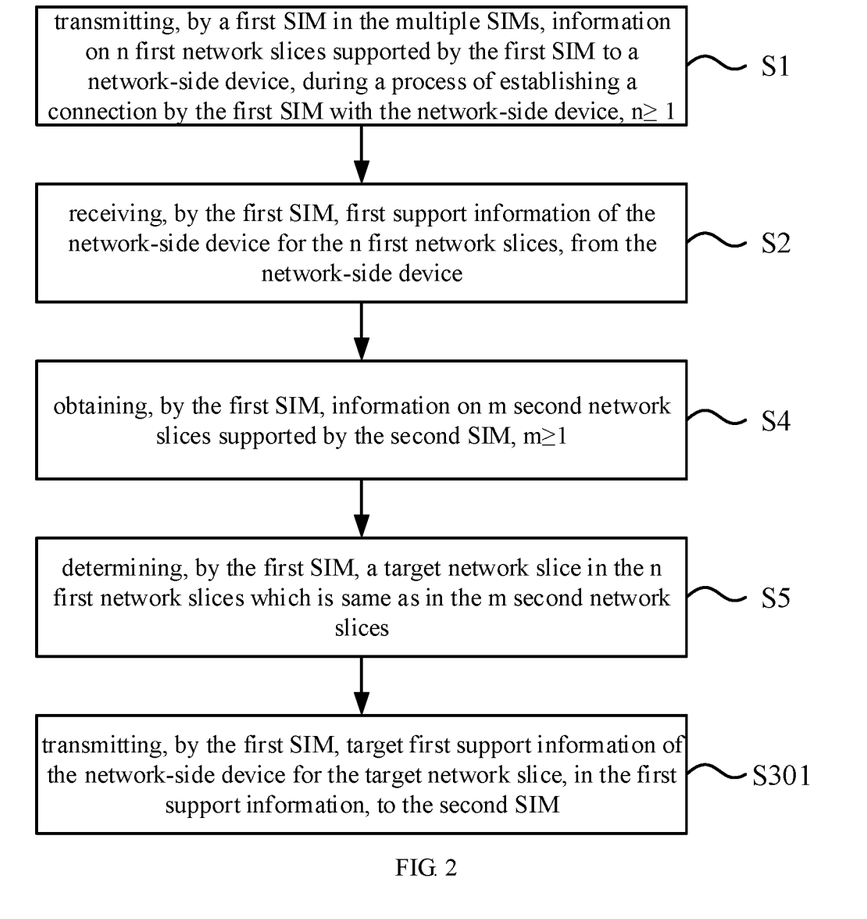
FIG. 2 is a flowchart illustrating another method for determining support information according to embodiments of the disclosure.

FIG. 2 is a flowchart illustrating another method for determining support information according to embodiments of the disclosure. As illustrated in FIG. 2, before the first SIM transmitting the first support information to the second SIM in the multiple SIMS, the method further includes the following.

In S4, the first SIM obtains information on m second network slices supported by the second SIM, m≥1.

In S5, the first SIM determines a target network slice in the n first network slices which is same as in the m second network slices.

The transmitting, by the first SIM, the first support information to the second SIM in the multiple SIMS includes the following.

In S301, the first SIM transmits target first support information of the network-side device for the target network slice, in the first support information, to the second SIM.

In some embodiments, the first SIM may communicate with the second SIM first, to obtain the information on the m second network slices supported by the second SIM, m≥1, where m may be an integer greater than or equal to 1, and m may be equal to or not equal to n.

Furthermore, the first SIM may determine the target network slice in the n first network slices which is the same as in the m second network slices. For example, the n first network slices supported by the first SIM are network slice A and network slice B, the m network slices supported by the second SIM are network slice A and network slice C, then the target network slice in the n first network slices which is the same as in the m second network slices is network slice A.

On this basis, the first SIM transmits the first support information to the second SIM. In detail, it may transmit the target first support information of the network-side device for the target network slice, in the first support information, to the second SIM. For example, the information that the network-side device supports network slice A is transmitted to the second SIM, instead of transmitting the information that the network-side device does not support network slice B to the second SIM. If the second SIM does not support other network slices other than the target network slice, in the network slices supported by the first SIM and the information on the other network slices supported by the network-side device is transmitted to the second SIM, the second SIM also does not support other network slices, and it wastes the resources occupied when transmitting information on other network slices supported by the network-side device.

According to some embodiments, the first SIM only transmits the target first support information of the network-side device for the target network slice in the first support information to the second SIM, which may avoid the resource waste caused when the information on other network slices supported by the network-side device is transmitted to the second SIM.

It should be noted that the first SIM and the second SIM may not interact with each other in advance. Instead, according to embodiments in FIG. 1, the first SIM transmits the complete first support information to the second SIM in the multiple SIMS.

Figure 3:
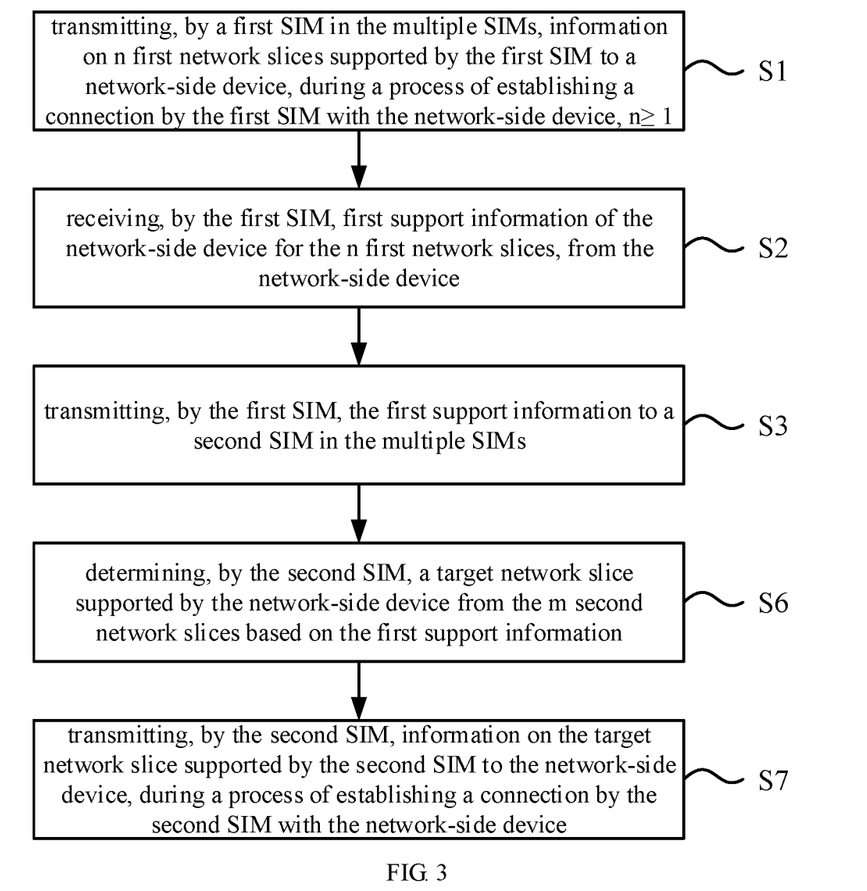
FIG. 3 is a flowchart illustrating still another method for determining support information according to embodiments of the disclosure.

FIG. 3 is a flowchart illustrating still another method for determining support information according to embodiments of the disclosure. As illustrated in FIG. 3, the second SIM supports information on m second network slices, m≥1, and the method further includes the following.

In S6, the second SIM determines a target network slice supported by the network-side device from the m second network slices based on the first support information In S7, the second SIM transmits information on the target network slice supported by the second SIM to the network-side device, during a process of establishing a connection by the second SIM with the network-side device.

In an embodiment, after receiving the first support information, the second SIM may determine the target network slice supported by the network-side device in the m second network slices based on the first support information, and then transmit the information on the target network slice supported by the second SIM during the process of establishing the connection with the network-side device.

For example, the second SIM supports network slice A and network slice C, and the first support information is that the network-side device supports network slice A but does not support network slice B. The target network slice supported by the network-side device in the m second network slices is network slice A. During the process of establishing the connection with the network-side device, the information on network slice A supported by the second SIM may be transmitted to the network-side device.

Accordingly, since the network-side device supports the target network slice, it may establish the connection with the second SIM, so that the network-side device connected to the second SIM and the second SIM may support the same network slice, ensuring that the second SIM communicating with the network-side device has good effects, and reducing the waste of signalings and resources.

Figure 4:
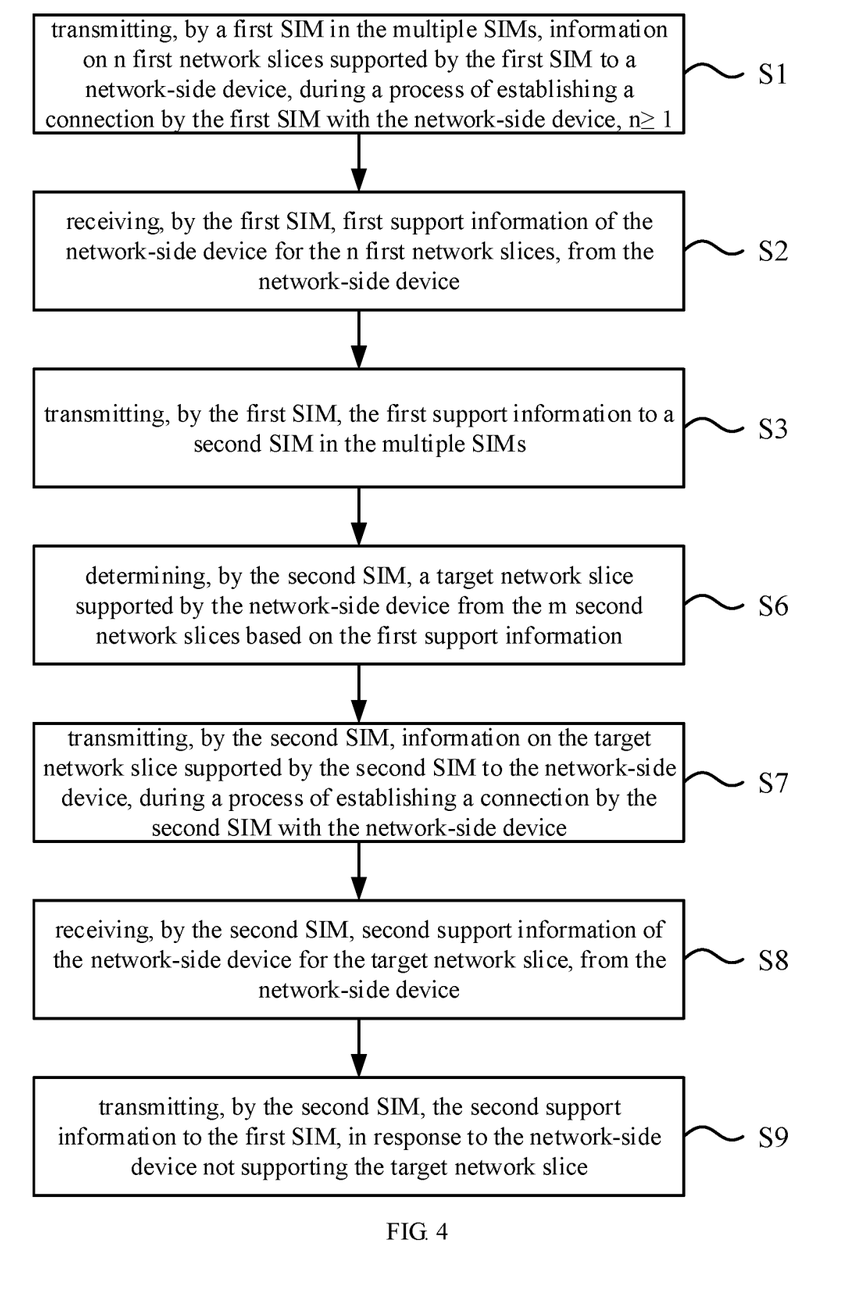
FIG. 4 is a flowchart illustrating still another method for determining support information according to embodiments of the disclosure.

FIG. 4 is a flowchart illustrating still another method for determining support information according to embodiments of the disclosure. As illustrated in FIG. 4, the method further includes the following.

In S8, the second SIM receives second support information of the network-side device for the target network slice, from the network-side device.

In S9, the second SIM transmits the second support information to the first SIM, in response to the network-side device not supporting the target network slice.

In an embodiment, after the second SIM transmits the information on the target network slice supported by the second SIM to the network-side device, the network-side device may feed the second support information back to the second SIM, and indicate the second SIM about the support condition of the network-side device for the target network slice through the second support information.

Although the second SIM determines that the network-side device supports the target network slice based on the first support information, the support condition of the network-side device for the network slices may change. The first SIM receives the first support information, which may occur before the support condition of the network-side device for the network slices changes, and the first support information is transmitted to the second SIM, which may occur after the support condition of the network-side device for the network slices changes. The first support information may not be accurate to reflect the support condition of the network-side device for the network slices changes. It is possible that after the support condition of the network-side device for the network slices changes, the network-side device does not support the target network slice.

Then the second SIM may determine whether the network-side device supports the target network slice based on the second support information. If the network-side device does not support the target network slice, the second SIM may determine that the support condition of the network-side device for the network slices changes. The second SIM transmits the second support information to the first SIM, so that the first SIM understands that the support condition of the network-side device for the network slices changes, and the specific change situation, including the change from supporting the target network slice to not supporting the target network slice.

Further, the first network-side device may re-transmit the information on the n first network slices supported by the first SIM to the network-side device, so as to re-determine, based on the feedback information of the network-side device, which network slice the network-side device supports, and which network slice the network-side device does not support.

Figure 5:
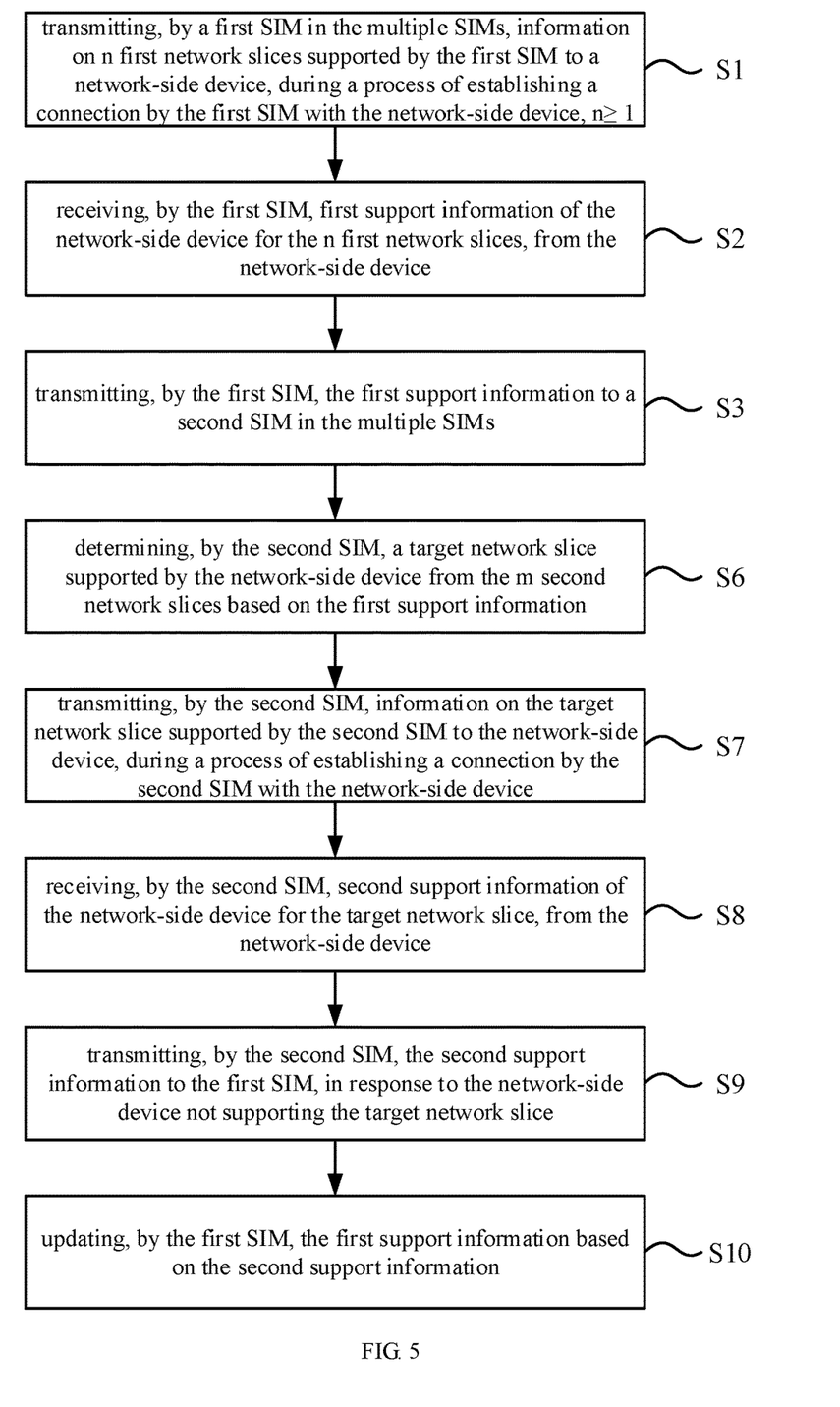
FIG. 5 is a flowchart illustrating still another method for determining support information according to embodiments of the disclosure.

FIG. 5 is a flowchart illustrating still another method for determining support information according to embodiments of the disclosure. As illustrated in FIG. 5, the method further includes the following.

In S10, the first SIM updates the first support information based on the second support information.

In an embodiment, the first SIM may update the first support information based on the second support information, for example, update the support condition of the target network slice in the first support information from the network-side device supporting the target network slice to the network-side device not supporting the target network slice, so that the first SIM subsequently transmits the first support information to a SIM other than the second SIM, which may ensure that the first support information is relatively accurate.

Corresponding to the foregoing embodiments of the method for determining support information, the disclosure also provides embodiments of an apparatus for determining support information.

Figure 6:
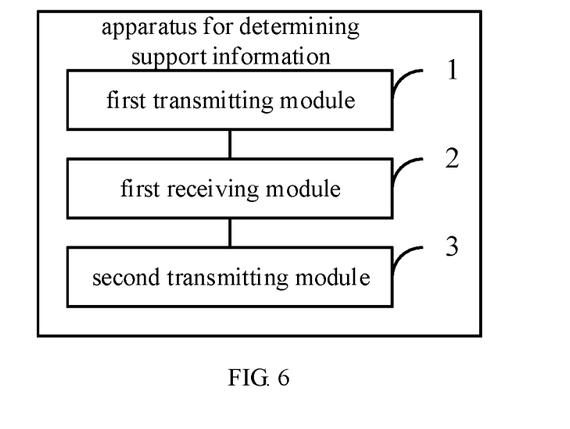
FIG. 6 is a block diagram illustrating an apparatus for determining support information according to embodiments of the disclosure.

FIG. 6 is a block diagram illustrating an apparatus for determining support information according to embodiments of the disclosure. The apparatus for determining support information in embodiments may be applicable to a terminal. The terminal may include, but be not limited to, an electronic device such as a mobile phone, a tablet computer and a wearable device. The terminal may be used as user equipment to communicate with the network-side device. For example, the terminal may communicate with the network-side device based on 5G NR.

Multiple SIMS may be set in the terminal, for example, two SIMs may be set, or more than two SIMS may be set. There may be SIMS using different operator networks in the multiple SIMs. There may also be SIMS using the same operator network in the multiple SIMs.

As illustrated in FIG. 6, apparatus for determining support information may include a first transmitting module 1, a first receiving module 2 and a second transmitting module 3.

The first transmitting module 1 is configured to transmit, by a first SIM in the multiple SIMs, information on n first network slices supported by the first SIM to a network-side device during a process of establishing a connection by the first SIM with the network-side device, n≥1.

The first receiving module 2 is configured to receive, by the first SIM, first support information of the network-side device for the n first network slices, from the network-side device.

The second transmitting module 3 is configured to transmit, by the first SIM, the first support information to a second SIM in the multiple SIMs.

Figure 7:
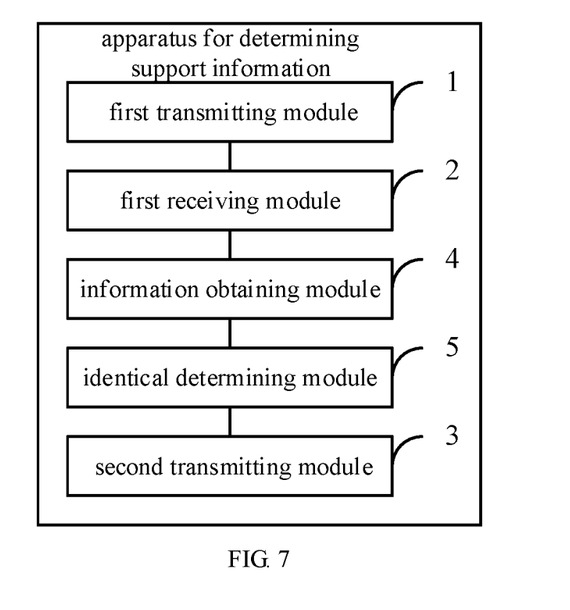
FIG. 7 is a block diagram illustrating another apparatus for determining support information according to embodiments of the disclosure.

FIG. 7 is a block diagram illustrating another apparatus for determining support information according to embodiments of the disclosure. As illustrated in FIG. 7, the apparatus further includes an information obtaining module 4 and an identical determining module 5.

The information obtaining module 4 is configured to obtain, by the first SIM, information on m second network slices supported by the second SIM, m≥1.

The identical determining module 5 is configured to determine, by the first SIM, a target network slice in the n first network slices which is same as in the m second network slices.

The second transmitting module 3 is configured to transmit, by the first SIM, target first support information of the network-side device for the target network slice, in the first support information, to the second SIM.

Figure 8:
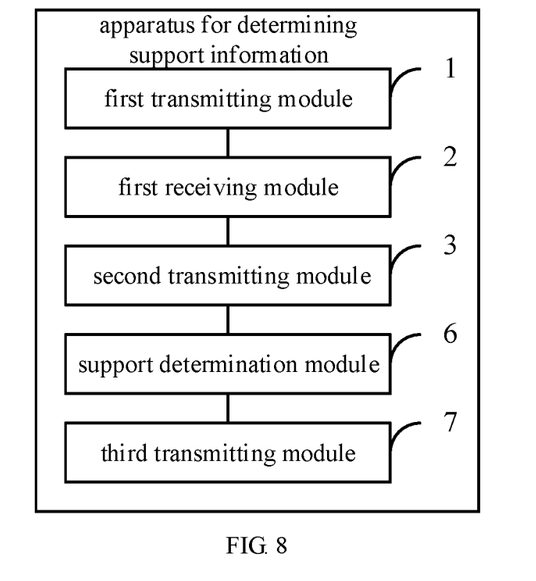
FIG. 8 is a block diagram illustrating still another apparatus for determining support information according to embodiments of the disclosure.

FIG. 8 is a block diagram illustrating still another apparatus for determining support information according to embodiments of the disclosure. As illustrated in FIG. 8, the second SIM supports information on m second network slices, m≥1, and the apparatus further includes a support determination module 6 and a third transmitting module 7.

The support determination module 6 is configured to determine, by the second SIM, a target network slice supported by the network-side device from the m second network slices based on the first support information.

The third transmitting module 7 is configured to transmit, by the second SIM, information on the target network slice supported by the second SIM to the network-side device, during a process of establishing a connection by the second SIM with the network-side device.

Figure 9:
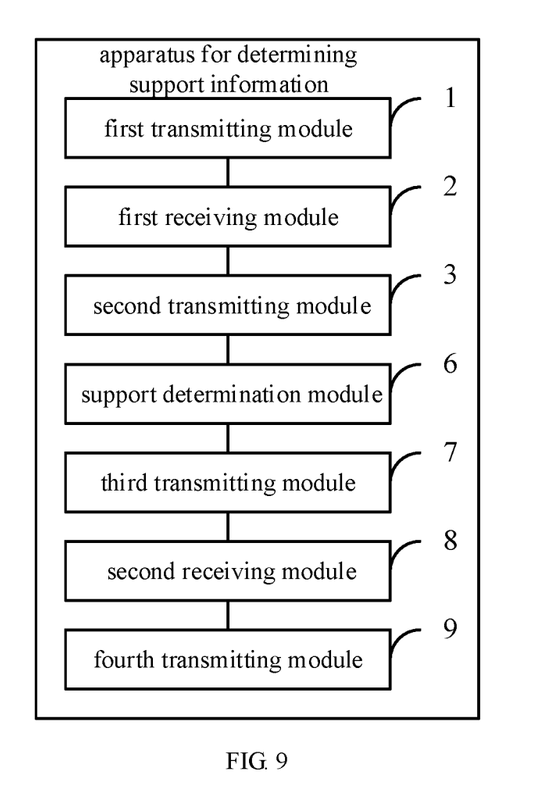
FIG. 9 is a block diagram illustrating still another apparatus for determining support information according to embodiments of the disclosure.

FIG. 9 is a block diagram illustrating still another apparatus for determining support information according to embodiments of the disclosure. As illustrated in FIG. 9, the apparatus further includes a second receiving module 8 and a fourth transmitting module 9.

The second receiving module 8 is configured to receive, by the second SIM, second support information of the network-side device for the target network slice, from the network-side device.

The fourth transmitting module 9 is configured to transmit, by the second SIM, the second support information to the first SIM, in response to the network-side device not supporting the target network slice.

Figure 10:
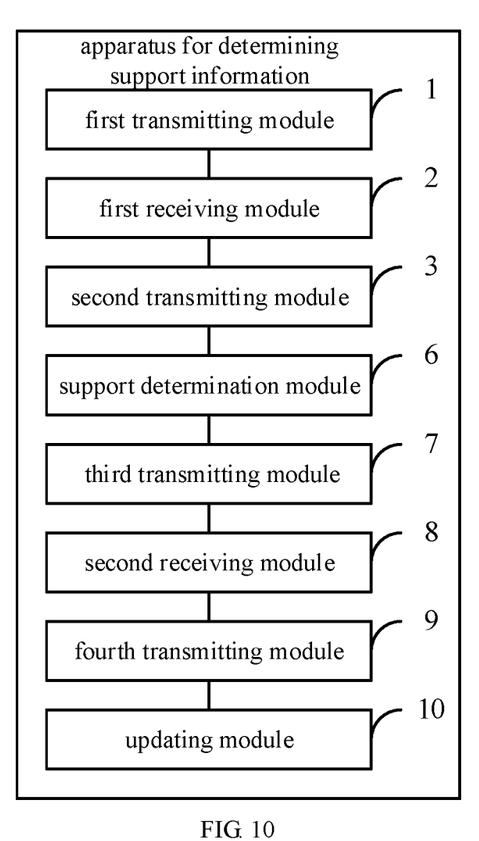
FIG. 10 is a block diagram illustrating still another apparatus for determining support information according to embodiments of the disclosure.

FIG. 10 is a block diagram illustrating still another apparatus for determining support information according to embodiments of the disclosure. As illustrated in FIG. 10, the apparatus further includes an updating module 10.

The updating module 10 is configured to update, by the first SIM, the first support information based on the second support information.

With respect to the apparatuses in the above embodiments, the specific manners for performing operations for individual modules therein have been described in detail in the embodiments regarding the methods, which will not be elaborated herein.

With respect to the apparatus embodiments, reference should be made to the description of the method embodiments for related parts since the apparatus embodiments basically corresponds to the method embodiments. The apparatus embodiments described above are merely illustrative. The modules described above as separate components may or may not be physically separated, and the components displayed as units may or may not be physical units. That is, they may be located in one place or distributed to multiple network units. Some or all of the modules may be selected based on actual needs to achieve the objectives of the solutions of the disclosure. Those of ordinary skill in the art will understand and implement without creative work.

Embodiments of the disclosure also propose an electronic device.

The electronic device includes a processor.

The electronic device further includes a memory for storing instructions executable by the processor.

The processor is configured to perform the method for determining support information described in any of the foregoing embodiments.

Embodiments of the disclosure also propose a computer-readable storage medium on which a computer program is stored. The computer-readable storage medium has stored therein instructions that, when executed by a processor, the method for determining support information described in any of the foregoing embodiments is performed.

Figure 11:
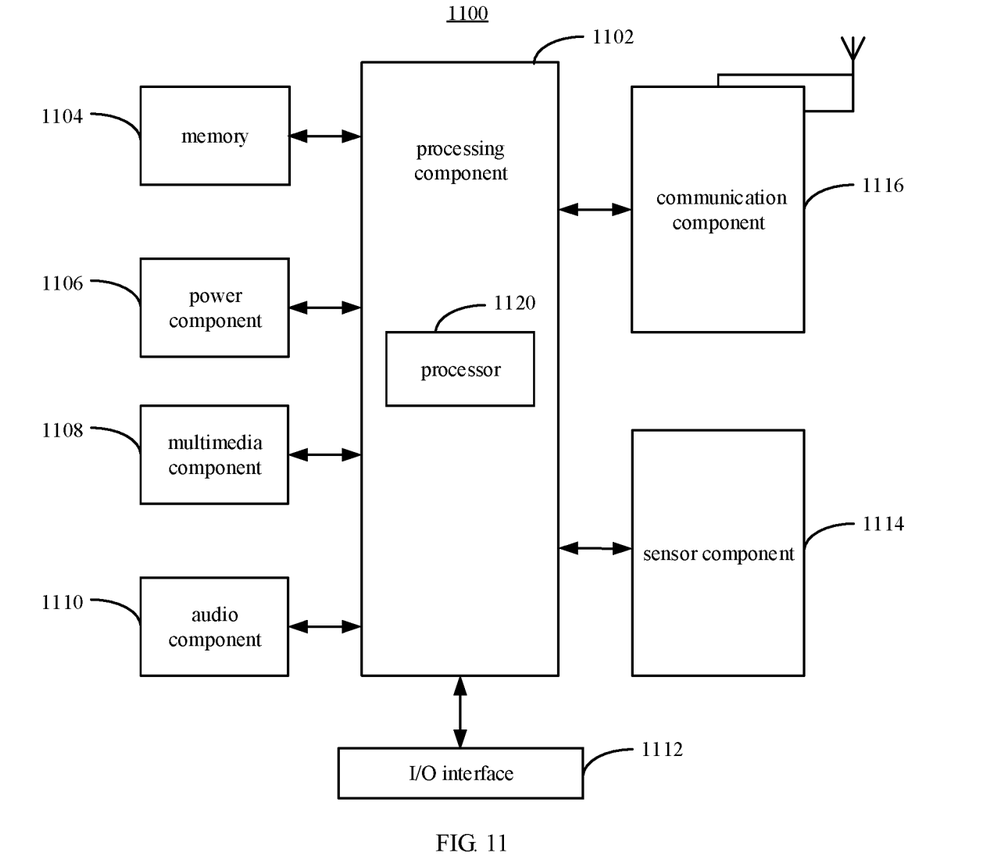
FIG. 11 is a block diagram illustrating a device for supporting information determination according to embodiments of the disclosure.

FIG. 11 is a block diagram illustrating a device 1100 for supporting information determination according to embodiments of the disclosure. The device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wireless, between the device 1100 and other devices. The device 1100 can access a wireless network based on a communication standard, such as WiFi, 2G; or 3G, 4G LTE, 5G or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

It should be noted that in the disclosure, relational terms such as first and second are used to distinguish one entity or operation from another entity or operation, and do not necessarily require or imply there is any such actual relationship or order among these entities or operations. The terms "include", "comprise", or any other variants thereof are intended to cover non-exclusive inclusion, so that a process, method, article or device that includes a series of elements includes not only those elements, but also other elements that are not explicitly listed, or elements inherent to such process, method, article or device. If there are no more restrictions, the element defined by the sentence "including a . . . " does not exclude the existence of other identical elements in the process, method, article, or device that includes the element.

The methods and devices or apparatuses provided by embodiments of the disclosure are described in detail above. Specific examples are used in the disclosure to illustrate the principles and implementations of the disclosure. The description of the above embodiments is only used to help understand methods of the disclosure and core ideas of methods. At the same time, for those of ordinary skill in the art, according to the ideas of the disclosure, there may be changes in the specific implementation and the scope of the disclosure. In summary, the content of the disclosure should not be construed as a limitation of the disclosure.

The invention claimed is:

1. A method for determining support information, performed by a terminal provided with multiple subscriber identification modules (SIMs), comprising:
transmitting, by a first SIM in the multiple SIMs, information on n first network slices supported by the first SIM to a network-side device, during a process of establishing a connection by the first SIM with the network-side device, n≥1;
receiving, by the first SIM, first support information of the network-side device for the n first network slices, from the network-side device; and
transmitting, by the first SIM, the first support information to a second SIM in the multiple SIMs,
wherein the second SIM supports information on m second network slices, m≥1, and the method further comprises:
determining, by the second SIM, a target network slice supported by the network-side device from the m second network slices based on the first support information; and
transmitting, by the second SIM, information on the target network slice supported by the second SIM to the network-side device, during a process of establishing a connection by the second SIM with the network-side device.

2. The method as claimed in claim 1, before transmitting, by the first SIM, the first support information to the second SIM in the multiple SIMs, further comprising:
obtaining, by the first SIM, information on the m second network slices supported by the second SIM, m≥1; and
determining, by the first SIM, the target network slice in the n first network slices which is the same as in the m second network slices;
wherein transmitting, by the first SIM, the first support information to the second SIM in the multiple SIMs, comprises:
transmitting, by the first SIM, target first support information of the network-side device for the target network slice, in the first support information, to the second SIM.

3. The method as claimed in claim 1, further comprising:
receiving, by the second SIM, second support information of the network-side device for the target network slice, from the network-side device; and
transmitting, by the second SIM, the second support information to the first SIM, in response to the network-side device not supporting the target network slice.

4. The method as claimed in claim 3, further comprising:
updating, by the first SIM, the first support information based on the second support information.

5. An electronic device provided with multiple subscriber identification modules (SIMs), comprising:
a processor; and
a memory for storing instructions executable by the processor;
wherein the processor is configured to:
transmit, by a first SIM in the multiple SIMs, information on n first network slices supported by the first SIM to a network-side device, during a process of establishing a connection by the first SIM with the network-side device, n≥1;
receive, by the first SIM, first support information of the network-side device for the n first network slices, from the network-side device; and
transmit, by the first SIM, the first support information to a second SIM in the multiple SIMS,
wherein the processor is configured to:
determine, by the second SIM, a target network slice supported by the network-side device from m second network slices based on the first support information; and
transmit, by the second SIM, information on the target network slice supported by the second SIM to the network-side device, during a process of establishing a connection by the second SIM with the network-side device.

6. The electronic device as claimed in claim 5, wherein the processor is configured to:
obtain, by the first SIM, information on the m second network slices supported by the second SIM, m≥1; and determine, by the first SIM, the target network slice in the n first network slices which is the same as in the m second network slices;

transmit, by the first SIM, target first support information of the network-side device for the target network slice, in the first support information, to the second SIM.

7. The electronic device as claimed in claim 5, wherein the processor is configured to:

receive, by the second SIM, second support information of the network-side device for the target network slice, from the network-side device; and transmit, by the second SIM, the second support information to the first SIM, in response to the network-side device not supporting the target network slice.

8. The electronic device as claimed in claim 7, wherein the processor is configured to:

update, by the first SIM, the first support information based on the second support information.

9. A non-transitory computer-readable storage medium having stored therein instructions that, when executed by a processor of an electronic device provided with multiple subscriber identification modules, SIMs, a method for determining support information is performed, the method comprising:

transmitting, by a first SIM in the multiple SIMs, information on n first network slices supported by the first SIM to a network-side device, during a process of establishing a connection by the first SIM with the network-side device, n≥1;

receiving, by the first SIM, first support information of the network-side device for the n first network slices, from the network-side device; and transmitting, by the first SIM, the first support information to a second SIM in the multiple SIMs, wherein the second SIM supports information on m second network slices, m≥1, and the method further comprises:

determining, by the second SIM, a target network slice supported by the network-side device from the m second network slices based on the first support information; and transmitting, by the second SIM, information on the target network slice supported by the second SIM to the network-side device, during a process of establishing a connection by the second SIM with the network-side device.

10. The non-transitory computer-readable storage medium as claimed in claim 9, wherein before transmitting, by the first SIM, the first support information to the second SIM in the multiple SIMs, the method further comprising:

obtaining, by the first SIM, information on the m second network slices supported by the second SIM, m≥1; and determining, by the first SIM, the target network slice in the n first network slices which is the same as in the m second network slices;

wherein transmitting, by the first SIM, the first support information to the second SIM in the multiple SIMs, comprises:

transmitting, by the first SIM, target first support information of the network-side device for the target network slice, in the first support information, to the second SIM.

11. The non-transitory computer-readable storage medium as claimed in claim 9, wherein the method further comprises:

receiving, by the second SIM, second support information of the network-side device for the target network slice, from the network-side device; and transmitting, by the second SIM, the second support information to the first SIM, in response to the network-side device not supporting the target network slice.

12. The non-transitory computer-readable storage medium as claimed in claim 11, wherein the method further comprises:

updating, by the first SIM, the first support information based on the second support information.

* * * * *